(12) United States Patent
Schaum et al.

(10) Patent No.: US 7,194,111 B1
(45) Date of Patent: Mar. 20, 2007

(54) HYPERSPECTRAL REMOTE SENSING SYSTEMS AND METHODS USING COVARIANCE EQUALIZATION

(75) Inventors: Alan P. Schaum, Alexandria, VA (US); Rulon Mayer, Garret Park, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 851 days.

(21) Appl. No.: 10/414,569

(22) Filed: Jul. 10, 2003

(51) Int. Cl.
*G06K 9/00* (2006.01)
*G06K 9/62* (2006.01)
*G06K 9/46* (2006.01)
*G06K 9/66* (2006.01)
*H04N 7/18* (2006.01)
*G01V 3/38* (2006.01)
*G06F 19/00* (2006.01)

(52) U.S. Cl. .................... 382/103; 382/159; 382/191; 382/206; 382/224; 348/144; 348/169; 702/5

(58) Field of Classification Search ............... 382/103, 382/107, 159, 160, 173, 190, 191, 209, 225, 382/228; 348/113–120, 144, 169; 702/3, 702/5
See application file for complete search history.

(56) References Cited

U.S. PATENT DOCUMENTS

| | | | |
|---|---|---|---|
| 6,008,492 A | 12/1999 | Slater et al. | |
| 6,347,762 B1 | 2/2002 | Sims et al. | |
| 6,958,466 B1 * | 10/2005 | Stein | .......................... 250/221 |
| 7,043,369 B2 * | 5/2006 | Kolodner et al. | ............... 702/3 |
| 7,058,197 B1 * | 6/2006 | McGuire et al. | ............. 382/100 |
| 2002/0012451 A1 | 1/2002 | Lin et al. | |
| 2002/0193971 A1 | 12/2002 | Whitsitt et al. | |
| 2005/0047663 A1 * | 3/2005 | Keenan et al. | ............... 382/225 |

OTHER PUBLICATIONS

Reed et al., "Adaptive Multiple-Band CFAR Detection of an Optical Pattern with Uknown Spectral Distribution", Oct. 10, 1990, pp. 1760-1770, vol. 38, No. 10, IEEE.

* cited by examiner

*Primary Examiner*—Andrew W. Johns
*Assistant Examiner*—Anthony Mackowey
(74) *Attorney, Agent, or Firm*—John J. Karasek; L. George Legg

(57) ABSTRACT

A method and apparatus for detecting a target or targets in a surrounding background locale based on target signatures obtained by a hyperspectral imaging sensor used the hyperspectral imaging sensor to collect raw target signature data and background locale data during a first data collection mission. The data is processed to generate a database including a plurality of target signatures and background data relating to the background locale. The hyperspectral imaging sensor is later used to collect further background data during a further, current data collecting mission so as to provide continuously updated background data, in real time. A covariance equalization algorithm is implemented with respect to the background data contained in the database and the updated background data collected during the current mission to effect transformation of each target signature of the database into a transformed target signature. A detection algorithm which employs the resultant transformed target signature is used to produce detection information related to the target or targets.

38 Claims, 1 Drawing Sheet

HYPERSPECTRAL REMOTE SENSING SYSTEMS AND METHODS USING COVARIANCE EQUALIZATION

FIELD OF THE INVENTION

The present invention relates to hyperspectral detecting or sensing systems for detecting military and intelligence targets for other uses.

BACKGROUND OF THE INVENTION

The detection of military and intelligence targets by airborne autonomous electro-optical reconnaissance systems is an important evolving capability associated with the maturation of hyperspectral (HS) camera technology. In recent years it has become clear that the primary factor limiting the effectiveness of these systems is no longer hardware performance, but rather the absence of useful knowledge about the in situ spectra of the targets. A similar problem exists in commercial applications. Laboratory reflectance spectra of materials sought by remote sensing systems must be translated into the spectral intensities measured in the field with an imaging spectrometer.

The HS detection algorithms that have been exercised by numerous researchers over the past decade basically fall into two categories. The first category, called anomaly detectors, relies on the simple fact that most manmade objects have spectral signatures different from the background against which they appear. Typically, these signatures are sufficiently distinct that automatic detection can be achieved with no prior knowledge of the spectrum of a particular target. However, all such algorithms to date have met a performance barrier. False alarm rates can be lowered no further, unless some type of supplementary information is provided, or the detection goals are narrowed (e.g., to the detection of changes only). Most importantly, operational stand-alone systems require false alarm detection rates one to two orders of magnitude lower than currently achievable with anomaly detectors.

The second category of detection algorithms relies on prior information, of variable precision, about the spectral signature of the target of interest. Such algorithms are intrinsically more capable than anomaly detectors because they exploit some knowledge of the target. These methods enhance performance in reconnaissance missions, and are essential for remote prospecting, in which mineral maps are generated from HS imagery.

The simplest signature-based method, called template matching, is appropriate when the desired sensed target spectrum, consisting of the spectral radiant intensities measured by a remote sensor, can be predicted accurately. Detection is achieved by simply comparing the prediction to the spectrum derived from each test pixel produced by a calibrated HS device. Such methods are most appropriate for detecting simple compounds under certain conditions (for example, exposed chemicals).

However, many intelligence applications require the detection of targets with imperfectly known signatures, making template matching unreliable. In commercial remote sensing applications, it is difficult to translate laboratory (reflectance or emittance) spectra into sensed (radiant energy) spectra, depending on the ambient illumination and a myriad of environmental conditions. To summarize, for remotely deployed systems, ideal knowledge of target signature information is seldom available.

The target variability can be broken down into two classes: static and dynamic. For manmade targets, sources of static variability include intrinsic features associated with paint constituents, alterations caused by weathering (oxidation) and the contamination of surface signatures by dirt. In addition, mixed pixels containing both target and background elements exhibit apparent target variability that derives ultimately from background variability. For geological mapping, unpredictable mixtures of materials and intrinsic spectral variability in complex minerals complicate the problem. Imperfect sensing generates more uncertainty in all cases. These combined effects lead to inexact target signature representations and are practically impossible to compensate for in a remote detection operation. If, however, the uncertainty can be characterized statistically, then optimal detectors, i.e., detector algorithms, can still be devised.

However, the primary limitation to detection performance arises from apparent (i.e., sensed) target signature variations that occur over time. This dynamic variability is substantial in remote sensing applications over periods as short as a few hours, and many intelligence applications require revisits within 24 hours. This dynamic variability also degrades the performance of a powerful terrain mapping method, in which a mineral or material is identified at one site, its spectrum is collected remotely, and this signature must be translated for use at another site, or at another time. The imprecision in target signature knowledge limits how low even an optimal false alarm or misclassification rate for the algorithm can be driven.

Sources of the dynamic signature variability, include such things as differing levels of background illumination associated with variable sun angles, unpredictable changes in sky illumination caused by clouds, and reflections from changed local backgrounds for targets that have moved. Diurnal changes in the atmosphere, especially those associated with haze, as well as in the moisture content of vegetation, also contribute to differences in the apparent spectra of backgrounds and targets. Finally, all sensing systems have some time-varying inconsistencies in their responses to the physical environment.

Considering some of the standard methods used in autonomous target detection with an HS system, a typical sensor is a digital camera modified to collect several, often many, contiguous wavelengths. The system requires data storage and computing devices and may include a communication downlink to a ground station. Instead of the three colors (wavelengths) typically collected by a commercial digital camera, an HS sensor used for reconnaissance often collects many hundreds of wavelengths. The associated large volume of information dictates that only a limited amount of streaming data can be stored onboard or telemetered in real time to the ground.

Instead of attempting to maintain an unwieldy database of all collected data, autonomous detection systems store statistical summaries describing the sensed background. These include the conventional measures of mean radiance $\mu_i$, and variance $\sigma_i^2$ for each sensed color i. If N wavelengths are collected, the mean values are arranged in the form of a vector $\mu_i$, an array (column) of N numbers, each of which represents the mean measured radiance in a different wavelength over some surveilled area. The variance is replaced by a two-dimensional array of numbers called a covariance matrix M. Its diagonal entries $M_{ii}$ are the conventional variances $\sigma_i^2$ for each color. However, the off-diagonal of matrix M entries encode additional information in the form of correlations between color channels, i.e., mutual dependencies in the measured radiances that characterize the particular background being reconnoitered.

Most experimental HS detection systems use these data to construct some form of anomaly detection algorithm. The most common form of anomaly detector is based on the so-called RX algorithm (see Reed, I. S. and X. Yu, Adaptive multi-band CFAR detection of an optical pattern with unknown spectral distribution, *IEEE, Trans. Acoustics, Speech, and Signal Processing,* 38(10), (1990), which is hereinafter referred to as the Reed et al reference and which is hereby incorporated by reference). The basic RX detector consists of comparing the computed test statistic $$s=(x-\mu)^t M^{-1}(x-\mu) \qquad (1)$$

to a number, called the threshold. The vector x is measured radiance at any test pixel, $M^{-1}$ is the inverse of the covariance matrix, and $^t$ refers to matrix transposition. (Computation of M and $\mu$ are described in Appendix 1 below.) The matrix multiplication in Equation (1) converts these quantities into a different number s for every pixel x that is encountered. If s exceeds the threshold, then the decision target is made by an onboard signal processor. Otherwise, the pixel is labeled background. A false alarm occurs when a background pixel generates a threshold exceedance, causing it to acquire a false label. The threshold is defined adaptively, based on the most recent estimates of first-and-second-order statistics, as represented by the mean values and covariance matrices. Combining this information with some standard theoretical assumptions produces a threshold value designed to keep the rate of false detections at a controlled low level.

This pixel-level detection is often followed by some simple form of spatial processing. For example, if the number of contiguous pixels expected to cover a given target shape is known, then a similar grouping of detections may also be used as a criterion for target declaration. It is noted that this type of spatial post-processing is unaffected by the methods of the present invention.

The lack of dependable target signature information has always made reliance on some form of anomaly detection necessary in autonomous HS detection systems. However, as indicated above, all such methods suffer limited performance in the form of excessive false alarm rates. The same problem limits the accuracy of mineral mapping techniques based on remote sensing.

SUMMARY OF THE INVENTION

An important object of the invention is to provide an advanced autonomous HS target detection system that overcomes or circumvents the fundamental limitations of the prior art systems described above. The system of the invention employs a novel method or technique for generating useful spectral target signatures. Detection algorithms in accordance with the invention which exploit such target signatures are expected to perform at nearly the theoretical limit allowed by the so-called linear matched filter. The latter is an optimal detection method when certain standard assumptions are satisfied. However, even when these assumptions are not satisfied, the method of signature generation in accordance with the invention is generally useful whenever prior target knowledge is essential to detection, for example in template matching, or in other methods described below. The spectral target signatures are generated, according to the invention, by a multivariate statistical algorithm that effects both sensor and atmospheric compensation without relying on any detailed physical models.

An important feature of the invention is that it drastically reduces the performance-degrading effects of dynamic variability in hyperspectral sensing systems. The invention does this by transforming target spectral signatures derived from one image to those appropriate to a second image thereby compensating for dynamic variability. This approach greatly enhances the detectability of similar targets at other locales in an image, and it facilitates an enhanced method of change detection. In the latter application, the transformation provided allows the assessment of change to be based not merely on a comparison of pixels deemed anomalous in each of their respective scenes, but also be based on a test of target similarity.

In accordance with a key feature of the invention, a compensation algorithm is employed which is referred herein to as a Covariance Equalization (CE). CE is based on a multivariate affine transformation. This is the same variety of transformation used whenever physical modeling of the dynamic changes described above are devised. However, CE requires no detailed models of either the environment or the sensing system. As will appear, the algorithm is derived from data commonly collected on HS remote sensing missions and does not rely on laboratory measurements.

Further features and advantages of the present invention will be set forth in, or apparent from, the detailed description of preferred embodiments thereof which follows.

DESCRIPTION OF THE PREFERRED EMBODIMENTS

Figures 1, 2:
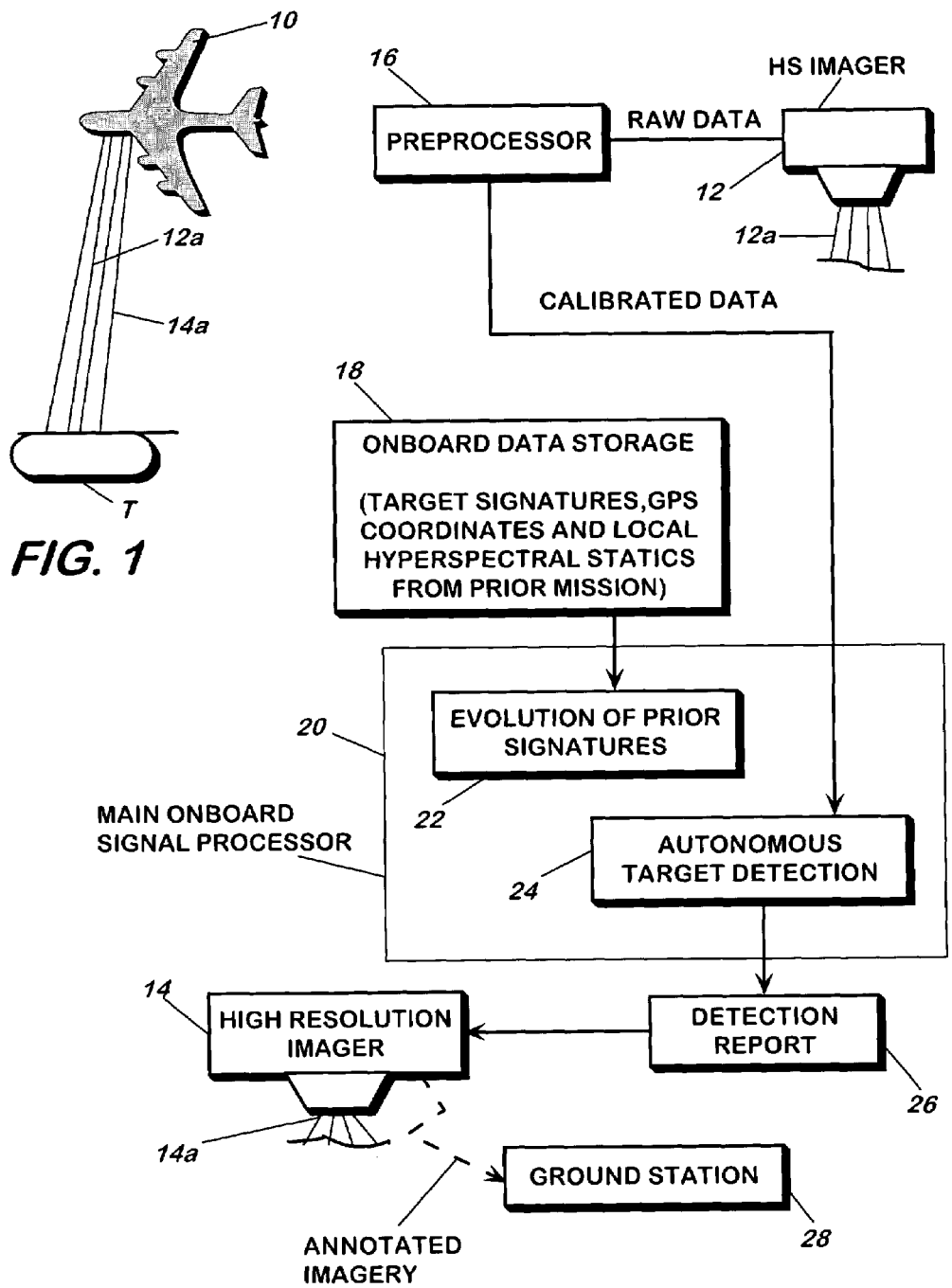
FIG. 1 is a highly schematic side elevational view of an aircraft equipped to provide imagery of a target.
FIG. 2 is a block diagram of a real-time onboard target detection system in accordance with a preferred embodiment of the invention.

As indicated above, the system and method of the invention make the use of signature information practical, thereby resulting in a drastic reduction in the system false alarm rate and paving the way for a stand-alone operational surveillance system based on remote, passive HS detection. Although the emphasis below is on military surveillance systems, the invention has other applications as was indicated previously, and, in this regard, the invention also greatly facilitates the detection of selected mineral outcroppings defined by signatures collected previously and validated by on-site inspection.

Turning to a more detailed description of the invention, as was also indicated above, the system of the invention is a component of a remote sensing system based on a hyperspectral sensor. The object or goal of the system is to find unusual (typically manmade) objects or known materials from an overhead vantage by exploiting spectral distinctions (reflectivities or emissivities) in the surface properties of these targets. The basic operational concept underlying the invention requires at least two passes of data-collecting missions (overflights) with respect to the same area or an overlapping area, on the first of which one or more target locations have somehow been confirmed. The source of confirmation can be either an HS detection made during the first flight, or any other intelligence asset. As indicated below, a further aspect of the invention concerns a variant embodiment that focuses on the detection only of changes in a scene (caused, for example, by the arrival or departure of an object).

In a preferred embodiment, the basic system of the invention consists of three main elements. The first is a database consisting of entries collected and processed on previous missions of a reconnaissance operation. The second is the affine compensation algorithm, called covariance equalization, which was described above. The third is a spectral matched filter detection algorithm, a particular version of which is discussed below.

These elements, the theory of their operation, and the change detection variant will now be described.

Considering the first element, the database consists of entries that pair (apparent) target spectra T with statistics of the background area against which the targets were located on an earlier mission. The target spectra are taken to be the test values x measured on pixels at which a target declaration had been made earlier, and confirmed. In military applications, the confirmation can be made by any intelligence asset. (In two systems developed by the assignee here, the WAR HORSE and DARK HORSE systems, the confirmation decision is made at the ground station, based on high spatial-resolution imagery derived from a camera cued by the onboard HS detection system.) In commercial applications, the confirmation can be made through a single site visit. The stored statistics include the mean vector $\mu$ and covariance matrix M of a background area surrounding each target, along with a record defining the geographic area, as derived from a GPS-based (Global Positioning System) location system.

The operational scenario under consideration here assumes that the HS sensor has collected several target signatures together with the associated background statistics on one or more earlier reconnaissance or data collection missions. Each such prior mission is referred to generically as a "Day 1" mission. The current mission is generically referred to as "Day 2." While the raw data from Day 1 can be thought of as having been collected in an autonomous manner, the preparation of the database for use on Day 2 involves man-in-the-loop post-processing of such raw data. The post-processing of the raw data from Day 1 consists mainly in a culling operation. Only data structures associated with confirmed targets are included in the database prepared for Day 2 operation. Furthermore, these targets must have been detected against backgrounds thought to be similar to the backgrounds planned for examination on Day 2 missions. In the simplest case, this involves scanning the same geographic area on Day 2 as on Day 1. Finally, only a limited number of data structures (on the order of ten or less) are prioritized for inclusion in the onboard database.

To summarize with respect to the database, the key data structures to be used on a Day 2 mission each consist of two vectors and a matrix: a Day 1 target signature $T_1$, and a background mean $\mu_1$ and covariance matrix $M_1$ that are associated with a locale surrounding the target location.

Turning to a consideration of covariance equalization, which is a dynamic variability compensation algorithm, in the course of a Day 2 mission, the reconnaissance system flies over backgrounds which are similar to or, preferably, partially overlapping with those encountered on previous missions that contributed entries to the database. The onboard signal processor implements a standard procedure for generating recursive estimates of background statistics on a continuous basis. These algorithms, which are as described in Appendix 1 below, or are equivalent algorithms, are used to compute/update estimates of the background means vector $\mu_2$ and covariance matrix $M_2$. The subscript 2 is used in the discussions below to denote a Day 2 value whereas values from the database will be denoted by the subscript 1.

After the standard recursive estimate procedure is implemented, the aforementioned affine compensation algorithm, Covariance Equalization (CE), is then applied to each target spectrum $T_1$ from the database, thereby transforming the spectrum into a predicted Day 2 target spectrum $T_2$. The CE algorithm requires both the database statistical values $\mu_1$, $M_1$, and the recursive estimates of the Day 2 statistics $\mu_2$ and $M_2$. The underlying assumption of CE is that all major effects contributing to differences between $\mu_1$ and $M_2$, and between $M_1$ and $M_2$, can be modeled with an affine transformation, which is a combination of offset (shift in the vector mean value) and linear transform.

When transforming a target signature $T_1$, the CE algorithm has the general form:

$$T_2 = \mu_2 + M_2^{1/2} \Lambda M_1^{-1/2}(T_1 - \mu_1). \tag{2}$$

The ½ notation is a reference to the unambiguous "square root of a nonnegative matrix." Both covariance matrix estimates $M_1$ and $M_2$ are examples of nonnegative matrices. Their square roots can be computed using standard software libraries for diagonalizing a matrix. For example, an orthogonal matrix $\psi_1$ can always be found such that $$M_1 = \psi_1 D_1 \psi_1^t, \tag{3}$$

in which $D_1$ is a diagonal matrix with nonnegative entries and the superscript t, as described above indicates matrix transposition. The square root of $M_1$ is then defined as $$M_1^{1/2} = \psi_1 D_1^{1/2} \psi_1^t, \tag{4}$$

in which the square root of $D_1$ is defined as a diagonal matrix whose entries are the positive square roots of $D_1$'s diagonals. The matrix $M_1^{-1/2}$ is defined to be the inverse of $M_1^{1/2}$ (and can be computed trivially from Equation (4)). Similar definitions apply to the Day 2 covariance matrix $M_2$.

The final quantity to be defined in Equation (2) is the orthogonal matrix $\Lambda$. For the HS data processing according to the embodiment of the invention being considered here, $\Lambda$ is chosen to be the identity matrix. For other multivariate applications, other choices for $\Lambda$ are more appropriate. A rationale for the general form of covariance equalization transformation in Equation (2), as well as for the particular choice of $\Lambda$ for HS applications, is included in Appendix 2.

Finally, the spectral matched filter detection algorithm, which is the third element in the system of the invention mentioned above, is a detection algorithm that exploits the transformed target signature vector $T_2$. The form of this detector (detection algorithm) can range from template matching to a more advanced idea called matched subspace detection (see A. Schaum, Spectral Subspace Matched Filtering, *Algorithms for Multispectral, hyperspectral, and Ultraspectral Imagery VII, Proc. Of SPIE*, Vol. 4381, 2001, pp. 1–17 which is hereby incorporated by reference). A robust, standard intermediate form is, the spectral linear matched filter (LMF), is employed in accordance with one preferred embodiment of the invention and will now be described.

As does the RX algorithm (Equation (1)) mentioned above, the LMF computes a detection statistic, here called $s_2$, whose value is used to decide whether a pixel contains a target or not. Unlike RX, the LMF uses an assumed intrinsic spectral signature $T_2$ which, in this discussion, is derived from covariance equalization (Equation (2)). The formula for the detection statistic is $$s_2 = (T_2 - \mu_2)^t M_2^{-1}(x_2 - \mu_2), \tag{5}$$

and is to be computed for each Day 2 test pixel's HS radiance value. This radiance value is represented by the column vector $x_2$. The inputs to this algorithm from the Day 2 data are the recursively estimated statistics $\mu_2$, $M_2$, and the test value $x_2$. The value of $T_2$ is determined by Equation (2) above, which requires both Day 1 and Day 2 statistics.

When the detector is the LMF detector, and CE is the compensation algorithm, the final detection statistic can be written:

$$s_2 = (T_1 - \mu_1)^t M_1^{-1/2} M_2^{-1/2} (x_2 - \mu_2). \tag{6}$$

For each text pixel, the value of $s_2$ relative to a threshold defines the decision "target" or "background." The threshold is defined adaptively and depends on the collected Day 2 multivariate statistics generated by local background measurements. The threshold value is adjusted continuously to maintain a low false alarm rate. The Reed et al reference, which was mentioned above, discussed adaptive methods of defining the threshold value in such a way that a specified false alarm rate can be maintained.

As set forth above, a further aspect of the invention involves the use thereof in change detection. More specifically, the method of spectral detection described above can also be used to greatly enhance the detectability of unusual changes occurring between Day 1 to Day 2. Such events are the primary concern of many military reconnaissance operations. The mathematically optimal method of change detection is known (and is called Chronochrome, as described in A. Schaum, A. Stocker, Long-Interval Chronochrome Target Detection, *Proc. 1997 International Symposium on Spectral Sensing Research*, 1998, which is hereby incorporated by reference), but this method cannot be applied unless an accurate (and expensive) pointing system designed to meet severe image registration requirements is integrated with the hyperspectral sensor.

The alternative change detection technique envisioned in accordance with this aspect of the invention involves applying matched filters to both Day 1 and Day 2 images. Besides the Day 2 matched filter (which is given by Equation (6)), a Day 1 matched filter, given as:

$$s_1 = (T_1 - \mu_1)^t M_1^{-1} (x_1 - \mu_1) \tag{7}$$

is computed and applied to test pixels $x_1$ from the Day 1 imagery. The values of $s_1$ and $s_2$ define detection maps that can be compared for consistency, so as to detect either the arrival/departure of objects in a scene, or changes in their disposition that indicate activity.

Considering the advantages and new features of the system of the invention, the system of the invention has the major advantage of achieving most of the theoretical gain associated with matched filtering without the burden of obtaining a priori knowledge of target signatures just before a Day 2 mission. As indicated above, the algorithm that makes this feasible is covariance equalization, the affine compensation procedure described previously. This algorithm produces an estimate of the Day 2 target signature, thereby obviating the need for a priori knowledge.

Other significant advantages are associated with the CE compensation algorithm. For example, the algorithm allows for a relatively compact database. In this regard, besides the target signature vector $T_1$, each data structure in the database contains only one additional vector $\mu_1$ and one matrix $M_1$. If the dimension of the spectra being collected has the typical value of 30, there are only 525 numbers to store per data structure ($\frac{1}{2}(30)(31)$ for the symmetric matrix $M_1$, plus 30 each for the mean vector $\mu_1$ and the signature vector $T_1$). Associated with this relatively small set of numbers is a low level of computational complexity.

There are several additional advantages. The spectra used to generate the mean and target vectors and the covariance matrices are all collected with the same instrument under very similar (flight) conditions. This results in a "common mode" type of rejection of interference factors that would adversely affect performance if spectra were collected with different instruments (e.g., a laboratory spectrometer and a remote sensing device). The statistics $\mu_1$ and $M_1$ can be very accurately estimated from the Day 1 collections, because typically thousands of image frames can be averaged.

Comparing the invention to alternative approaches, as indicated above, the standard approach to HS target detection is to search for spectra that appear anomalous to the local background. As described above, performance is limited in this approach.

Better approaches that attempt to exploit target signature information must account for the altered in situ appearance of target spectra. The problem arises because the signature data are derived under a set of conditions different from that encountered operationally. The most common form of conditioning of the signature is to construct a model of the atmosphere (only) and attempt to infer its effects on the apparent target spectrum.

The use of CE to accomplish the conditioning has several advantages over this form of conditioning, as follows:

CE accounts for, at the same time, many effects that are usually modeled separately. Typically, one model is used for atmospheric effects, another for soil/vegetation moisture changes, and yet another for illumination compensation. Moreover, great efforts are usually expended to eliminate sensor artifacts. The corrections usually involve the use of sensor-specific affine transformations. CE compensates for all these effects jointly, using multivariate statistics derived from thousands of pixels.

CE does not rely on a detailed atmospheric model. Such models are described, for example, in A. Schaum, A. Stocker, Long-Interval Chronochrome Target Detection, *Proc. 1997 International Symposium on Spectral Sensing Research*, 1998 and these models typically attempt to estimate atmospheric constituents, based on data at selected wavelengths. These methods are often confounded when the viewing geometry is from above, as in a reconnaissance operation, because of interference from the larger terrestrial signals.

A related method of scene compensation called VANTAGE and described in E. P. Crist, J. W. Wegrzyn, J. N. Cederquist, Automatic Scene-Adaptive Target Detection in Hyperspectral Emissive Data, 2000 *Meeting of Military Sensing Symposium Specialty Group on CCD*, vol. 2, pp. 89–98, 2000, attempts to use a spectral feature in chlorophyll to detect vegetation in each of two images. It then uses the vegetation as a calibration source to "normalize" Day 2 data to correspond to that from Day 1. However, the VANTAGE approach fails to account for any offset in the relative responses of the sensor system (something that is accomplished in CE by use of the first-order statistics), and VANTAGE normalizes each spectral channel independently. This means that channels far from the chlorophyll feature are modified much less reliably. It also means that the covariance matrices are not equalized, only the variances. Also, the method can only be applied to scenes both of which contain verdant vegetation; it does not apply at all to HS systems operating at wavelengths outside the chlorophyll feature. Mayer et al. "Object Detection and Color Constancy Using a Whitening Transformation in Multispectral Imagery" (presented April 2002, published February 2003 in Proceedings; 2002 Parallel Meetings of the MSS Specialty groups on Passive Sensors; Camouflage, Concealment and Deception; Detectors; and Materials: Veridian Ann Arbor) discusses related material in the context of multi-spectral sensing and detection. Schaum and Stocker "Linear Chromodynamic Models for Hyperspectral Target Detection: (published February 2003 in Proceeding of IEEE Aerospace Conference) discussed mathematical details underlying some of the central ideas above.

Preliminary results of using CE to generate target signatures indicate that there is a large reduction in false alarm rate, approaching the idealized limit of performance.

With respect to a change detection variant, in operational surveillance applications, precision image registration is impossible without extreme expense, and this makes the ideal change detection technique (i.e., the "Chronochrome" approach mentioned above) impractical. Instead, one is forced to compare target detections made independently at two or more times. As described above, CE combined with matched filtering is an alternative that amplifies the target signals. The conventional method compares low signal-to-clutter ratio signals derived from an anomaly detector, which is one of a class of algorithms that cannot exploit signature information. CE enhances signal-to-noise ratios achievable with conventional methods of change detection.

Turning now to the drawings, FIG. 1 shows, in a highly schematic manner, an aircraft 10 overflying a target (e.g., a tank) T. The aircraft 10 uses both hyperspectral (HS) imagery, as discussed above and represented by beam 12a, and visible panchromatic high resolution imagery, represented by beam 14a, in detecting target T. As discussed below, a HS imager 12 and a high resolution imager 14 are part of the real-time onboard target detection system shown in FIG. 2.

Referring to FIG. 2, the hyperspectral imager 12 outputs raw data to a preprocessor 16 which converts the raw data into the calibrated data described above. The system includes onboard data storage 18 for storing target signatures, GPS coordinates and local hyperspectral statistics from a prior mission or missions. This information is used by a main onboard signal processor 20 in the evolution of prior signatures, as represented by block 22, in the manner described hereinbefore. Processor 20 also provides autonomous target detection as represented by block 24 and as was also described previously.

Processor 20 outputs a detector report, indicated by block 20, which is used in controlling the high resolution imager 14, i.e., in providing imager 14 with real-time detection for use thereby. Imagery obtained by imager 14 is annotated and transmitted by a radio link or the like to a ground station 28.

Appendix 1. Recursive Estimation of Background Multivariate Statistics.

This appendix describes a recursive algorithm for the estimation of the background mean vector and covariance matrix. A recursive algorithm computes a new value (the $n^{th}$ value) on receipt of a new observation (also conventionally labeled $n^{th}$) based on the value of a new observation and the past few old values ($n-1^{th}$, $n-2^{th}$ etc.). In the algorithm of interest here, only the $(n-1)^{th}$ values are used. The algorithm is $$\mu_n = (1-\alpha)\mu_{n-1} + \alpha x_n$$

(A-1)

$$M_n = (1-\alpha)M_{n-1} + \alpha(1-\alpha)(x_n - \mu_{n-1})(x_n - \mu_{n-1})^t.$$

In this expression, the vector $x_n$ is the newest hyperspectral observation, (The subscripts here are not the same as Day 1 and Day 2 subscripts used above.) The parameter α determines the strength with which a new observation influences the recursive estimate for μ and M. It is an adjustable parameter with a typical value of 0.02.

Appendix 2. Covariance Equalization

The affine compensation algorithm described above is not optimal in a mathematical sense. However, several strong factors motivate its use.

The mathematically ideal transformation from Day 1 to Day 2 data is known. It is the "Chronochrome" technique mentioned above. However, implementing Chronochrome is usually impractical, because it requires strict operational and sensing conditions. Day 1 and Day 2 scenes need to be geographically identical, and the sensor pointing direction, orientation, and sampling phases on Day 2 must perfectly reproduce those from Day 1.

On the other hand, the CE algorithm (Equation (2) above) does not impose such requirements and originated as an approximate solution to the same minimum mean squared error problem that the Chronochrome approach solves exactly. CE can thus be thought of as an approximation to the ideal solution.

CE can also be derived as the solution to a maximum likelihood problem. Maximum likelihood is a standard procedure used to generate sub-optimal solutions to problems for which ideal information is lacking. The missing information in the operational surveillance problem is the pixel-level correlations, which cannot be known because of imperfect image registration, or because Day 2 data derive from a different geographic location from Day 1.

If CE is applied to Day 1 background data x, instead of only to the target $T_1$ (so that $x_1$ replaces $T_1$ in Equation (2) above), it produces an estimate of how each pixel would be transformed if the sensing conditions on Day 1 were replaced by those on Day 2. Indeed, CE is called covariance equalization because such transformed background data have identical first-order (mean value) and second-order (covariance matrix) statistics to the actual Day 1 statistics. These statistical characterizations of the data are virtually the only ones ever used for detection/discrimination purposes. CE perfectly equalizes all of them.

The underlying idea motivating the use of the algorithm in the manner described above is that target spectra should be transformed in the same way as background spectra. The only circumstance for which this assumption should not hold is when intrinsic spectral properties of the target change from Day 1 to Day 2. (However, in this case the change detection method described above is applicable.)

The choice of the transformation Λ (Equation (2)) as the unit matrix depends on the application being spectral. This include not only the HS utility emphasized above, but also applications where more widely separated bands (usually called "multispectral") are used. However, for other types of multivariate usage, different choices are appropriate.

Most generally, Λ could be chosen as some rotation (plus a possible axis permutation) for the spectral application, but there is no general theoretical guideline for selecting which one except the trivial choice of the identity matrix (Λ=1)/ There are some physics-based arguments (beyond the scope of this discussion) implying that any rotations in HS applications should be small.

The only data-driven choices for Λ are the two mentioned above, either Λ=1 or $\Lambda=\Lambda_2\Lambda^t_1$. However, the second choice is not robust in the situation where some of the eigenvalues of the background covariance matrix are nearly degenerate. For high-dimensional HS data, this condition of near-degeneracy almost always applies and is associated with the inevitable presence of measurement noise. The mathematical formalism supporting this observation is that of principal component analysis applied to HS data. The details of this argument are also beyond the scope of this disclosure and are strictly peripheral to it.

Although the invention has been described above in relation to preferred embodiments thereof, it will be understood by those skilled in the art that variations and modifications can be effected in these preferred embodiments without departing from the scope and spirit of the invention.

What is claimed:

1. A method for detection of at least one target in a background locale surrounding the target and overflown by an aircraft having an on-board detector system including a hyperspectral imaging sensor and a real-time processor, and based on target spectra obtained by said hyperspectral imaging sensor, said method comprising:

using said hyperspectral imaging sensor to collect raw data including target spectra and background statistics with respect to the at least one target in said background locale, during at least one overflight;

processing the raw data prior to a further overflight to produce a database including preselected data structures, said data structures including a plurality of target signatures $T_1$, and a background mean $\mu_1$ and a covariance matrix $M_1$ associated with the locale surrounding the target;

using the real-time processor to generate recursive estimates of background statistics on a continuous basis during a further overflight so as to derive further estimates of the background mean vector, denoted $\mu_2$, and the covariant matrix, denoted $M_2$;

applying a covariance equalization algorithm to each target signature $T_1$ from the database so as to provide transformation thereof into transformed target signature $T_2$ wherein $$T_2 = \mu_2 + M_2^{1/2} \Lambda M_1^{-1/2}(T_1 - \mu_1)$$

wherein the superscript ½ indicates a square root and $\Lambda$ indicates an orthogonal matrix; and using a detection algorithm that exploits the transformed signature $T_2$ to derive a detection statistic.

2. A method according to claim 1 wherein said further overflight is over an identical background to the background overflown during said at least one overflight.

3. A method according to claim 1 wherein said further overflight is over a background that overlaps the background overflown during said at least one overflight.

4. A method according to claim 1 wherein only data structures associated with confirmed targets are included in said database.

5. A method according to claim 4 wherein only data structures associated with confirmed targets detected against backgrounds similar to backgrounds planned to be overflown during said further overflight are included in said database.

6. A method according to claim 5 wherein a number of data structures no greater than ten is included in said database.

7. A method according to claim 1 wherein said recursive algorithm computes new value $\mu_n$ and $M_n$ for the mean background $\mu_1$ and covariance matrix $M_1$ upon receipt of a new observation as follows:

$$\mu_n = (1-\alpha)\mu_{n-1} + \alpha x_n; \text{ and}$$

$$M_n = (1-\alpha)M_{n-1} + \alpha(1-\alpha)(x_n - \mu_{n-1})(x_n - \mu_{n-1})^t$$

wherein $x_n$ is the newest hyperspectral observation, $\alpha$ is a parameter based on strength of influence of a new observation on recursive estimates of $\mu$ and $M$, and t indicates a matrix transposition.

8. A method according to claim 1 wherein said square roots are computed using a software library for diagonalizing a matrix.

9. A method according to claim 1 wherein $M_1^{1/2}$ is determined using the formula:

$$M_1^{1/2} = \psi_1 D_1^{1/2} \psi_1^t$$

wherein $D_1$ is a diagonal matrix with non-negative entries, $D^{1/2}$ is a diagonal matrix having, as entries, positive square roots of the diagonals of the diagonal matrix $D_1$, and t indicates a matrix transposition.

10. A method according to claim 1 wherein $\Lambda = 1$.

11. A method according to claim 1 wherein said detection algorithm comprises a template matching algorithm.

12. A method according to claim 1 wherein said detection algorithm comprises a matched subspace detection algorithm.

13. A method according to claim 1 wherein said detection algorithm comprises a spectral linear matched filter.

14. A method according to claim 13 wherein said spectral linear matched filter derives a detection statistic s wherein $$s = (T_2 - \mu_2)^t M_2^{-1}(x_2 - \mu_2),$$

wherein s is computed for the hyperspectral radiance value for each test pixel for said further overflight, wherein $x_2$ is a column vector representing the hyperspectral radiance value and t indicates a matrix transposition.

15. A method according to claim 14 wherein, for each test pixel, said detection statistic s is compared with a threshold so as to define a decision target or background.

16. A method according to claim 15 wherein the threshold is defined adaptively and depends on multivariate statistics collected during said further overflight and generated by local background measurements.

17. A method for detecting at least one target in a surrounding background locale based on target signatures obtained by a hyperspectral imaging sensor, said method comprising:

using the hyperspectral imaging sensor to collect raw target signature data and background locale data with respect to at least one target during at least one data collecting mission;

processing the raw target signature data and background locale data collected during said at least one mission so as to generate a database including a plurality of target signatures and background data relating to the background locale surrounding the at least one target;

using said hyperspectral imaging sensor to collect further background data during a further, current data collecting mission;

continuously updating, in real time, the background data collected during said current mission;

implementing a covariance equalization algorithm with respect to the background data contained in said database and the updated background data collected during the current mission to effect transformation of each target signature of said database into a transformed target signature; and using a detection algorithm which employs the transformed target signatures to produce detection information related to the at least one target.

18. A method according to claim 17 wherein said database comprises data structures including a plurality of target signatures $T_1$, and a background mean $\mu_1$ and a covariance matrix $M_1$ associated with the locale surrounding the target; wherein said continuously updating of said background data comprises using a real-time processor to generate recursive estimates of background statistics on a continuous basis during the current mission so as to derive further estimates of the background mean vector, denoted $\mu_2$, and the covariant matrix, denoted $M_2$; and wherein said covariance equalization algorithm is applied to each target signature $T_1$ from the database so as to provide transformation thereof into transformed target signature $T_2$ based on the formula:

$$T_2 = \mu_2 + M_2^{1/2} \Lambda M_1^{-1/2} (T_1 - \mu_1)$$

wherein the superscript ½ indicates a square root and $\Lambda$ is an orthogonal matrix.

19. A method according to claim 17 wherein said missions each comprise an overflight by an aircraft having an onboard detector system including said hyperspectral imaging sensor and a real-time processor.

20. A method according to claim 17 wherein said method is used in mineral mapping wherein raw data is collected remotely, and said missions comprise separate visits to an area to be mapped.

21. A method according to claim 17 wherein said current mission is to an identical background to the background encountered during said at least one mission.

22. A method according to claim 17 wherein said current mission is to a background that overlaps the background encountered during said at least one mission.

23. A method according to claim 17 wherein only data structures associated with confirmed targets are included in said database.

24. A method according to claim 23 wherein only data structures associated with confirmed targets detected against backgrounds similar to backgrounds planned to be encountered during said further mission are included in said database.

25. A method according to claim 24 wherein a number of data structures no greater than ten is included in said database.

26. A method according to claim 19 wherein said recursive algorithm computes new value $\mu_n$ and $M_n$ for the mean background $\mu_1$ and covariance matrix $M_1$ upon receipt of a new observation as follows:

$$\mu_n = (1-\alpha)\mu_{n-1} + \alpha x_n; \text{ and}$$

$$M_n = (1-\alpha)M_{n-1} + \alpha(1-\alpha)(x_n - \mu_{n-1})(x_n - \mu_{n-1})^t$$

wherein $x_n$ is the newest hyperspectral observation, $\alpha$ is a parameter based on strength of influence of a new observation on recursive estimates of $\mu$ and $M$, and $t$ indicates a matrix transposition.

27. A method according to claim 19 wherein said square roots are computed using a software library for diagonalizing a matrix.

28. A method according to claim 19 wherein $M_1^{1/2}$ is determined using the formula:

$$M_1^{1/2} = \psi_1 D_1^{1/2} \psi_1^t$$

wherein $D_1$ is a diagonal matrix with non-negative entries, $D_1^{1/2}$ is a diagonal matrix having, as entries, positive square roots of the diagonals of the diagonal matrix $D_1$ and $t$ indicates a matrix transposition.

29. A method according to claim 19 wherein $\Lambda=1$.

30. A method according to claim 18 wherein said detection algorithm comprises a template matching algorithm.

31. A method according to claim 18 wherein said detection algorithm comprises a matched subspace detection algorithm.

32. A method according to claim 18 wherein said detection algorithm comprises a spectral linear matched filter.

33. A method according to claim 32 wherein said spectral linear matched filter derives a detection statistic $s$ wherein $$s = (T_2 - \mu_2)^t M_2^{-1} (x_2 - \mu_2),$$

wherein $s$ is computed for the hyperspectral radiance value for each text pixel for said further overflight, and wherein $x_2$ is a column vector representing the hyperspectral radiance value, and $t$ indicates a matrix transposition.

34. A method according to claim 33 wherein, for each test pixel, $s$ is compared with a threshold so as to define a decision target or background.

35. A method according to claim 34 wherein the threshold is defined adaptively and depends on multivariate statistics collected during said further mission and generated by local background measurements.

36. A system for detecting at least one target in a surrounding background locale based on target signatures, said apparatus comprising:
a hyperspectral imaging sensor for collecting raw target signature data and background locale data with respect to at least one target during a first data collecting mission and for collecting further background data during a further, current data collection mission such that the background data collected during the current mission is continuously updated in real time;
processing means for processing the raw target signature data and background locale data collected during said at least one mission so as to generate a database including a plurality of target signatures and background data relating to the background locale surrounding the at least one target;
storage means for storing said database; and
means for implementing a covariance equalization algorithm with respect to the background data contained in said database and the updated background data collected during the current mission to effect transformation of each target signature of said database into a transformed target signature so as to produce a plurality of transformed target signatures, and for using a detection algorithm which employs the transformed target signatures to produce detection information related to the at least one target.

37. A system according to claim 36 further comprising a high resolution imager for receiving said detection information.

38. A system according to claim 37 wherein said apparatus is located in an aircraft and further comprises means for transmitting annotated images produced by said high resolution imager to a ground station.

* * * * *